No. 891,706. PATENTED JUNE 23, 1908.
C. C. KING.
CLAM SHELL BUCKET.
APPLICATION FILED APR. 4, 1908.

3 SHEETS—SHEET 2.

Attest:

Inventor:
by Charles C. King
Redding, Greeley & Austin
Attys.

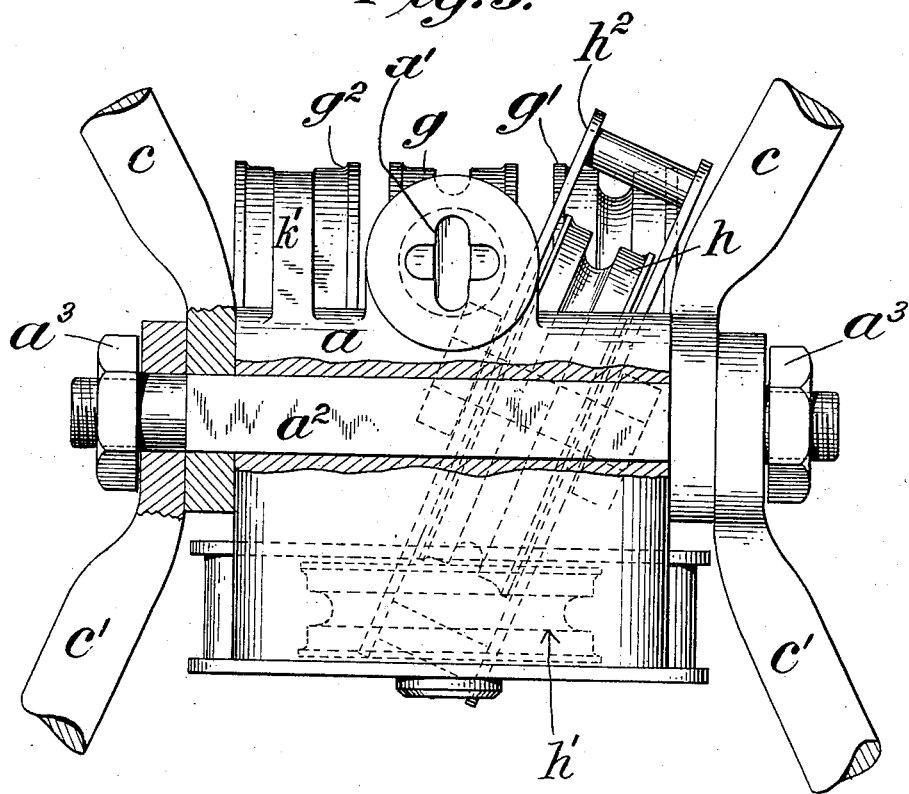

UNITED STATES PATENT OFFICE.

CHARLES C. KING, OF NEW YORK, N. Y., ASSIGNOR TO C. W. HUNT COMPANY, OF NEW YORK, N. Y., A CORPORATION OF NEW YORK.

CLAM-SHELL BUCKET.

No. 891,706.    Specification of Letters Patent.    Patented June 23, 1908.

Application filed April 4, 1908. Serial No. 425,122.

*To all whom it may concern:*

Be it known that I, CHARLES C. KING, a citizen of the United States, residing in West New Brighton, in the borough of Richmond, of the city of New York, in the State of New York, have invented certain new and useful Improvements in Clam-Shell or Grab Buckets or Shovels, of which the following is a specification, reference being had to the accompanying drawings, forming a part hereof.

This invention relates to clam-shell or grab buckets or shovels which comprise in their construction scoops or shovel members pivotally connected to the head piece and to each other and upper and lower sheaves carried respectively by the head-piece and by the scoops or shovel members and about which the closing rope passes. In the operation of such grab buckets, as ordinarily constructed, there is a tendency for the head-piece to twist out of position when the tension of the operating ropes is relaxed, and there is also a tendency for the bucket or shovel to tilt to one side when suspended from the closing chain or rope, by reason of the fact that the closing chain or rope is not centrally located with reference to the central plane of the bucket. If the hoisting rope or chain is arranged to lead centrally from the bucket, then the sheaves around which the chain runs are at one side of the center and the shovel is thrown out of balance.

It is the object of the present invention to improve the construction of such shovels or buckets so as to overcome these difficulties and in accordance therewith the connection between the head-piece and the links or arms which are connected to the scoops or shovel members is so constructed and arranged that the head-piece remains in an upright position when the ropes are slackened, and means are provided whereby the closing chain or rope shall lead always from the central plane of the shovel.

The invention will be more fully explained hereinafter with reference to the accompanying drawings in which it is illustrated as applied to a bucket or shovel of ordinary construction.

Figure 1:
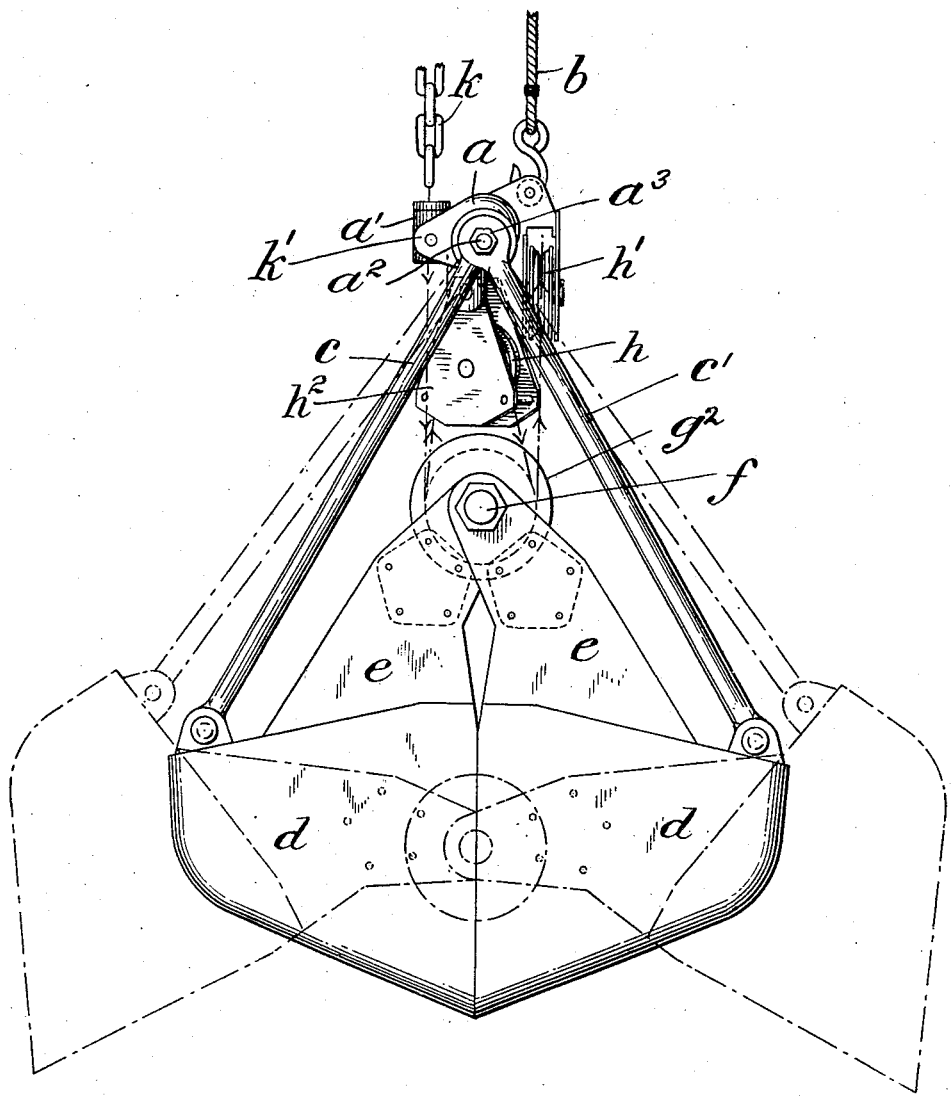
Figure 2:
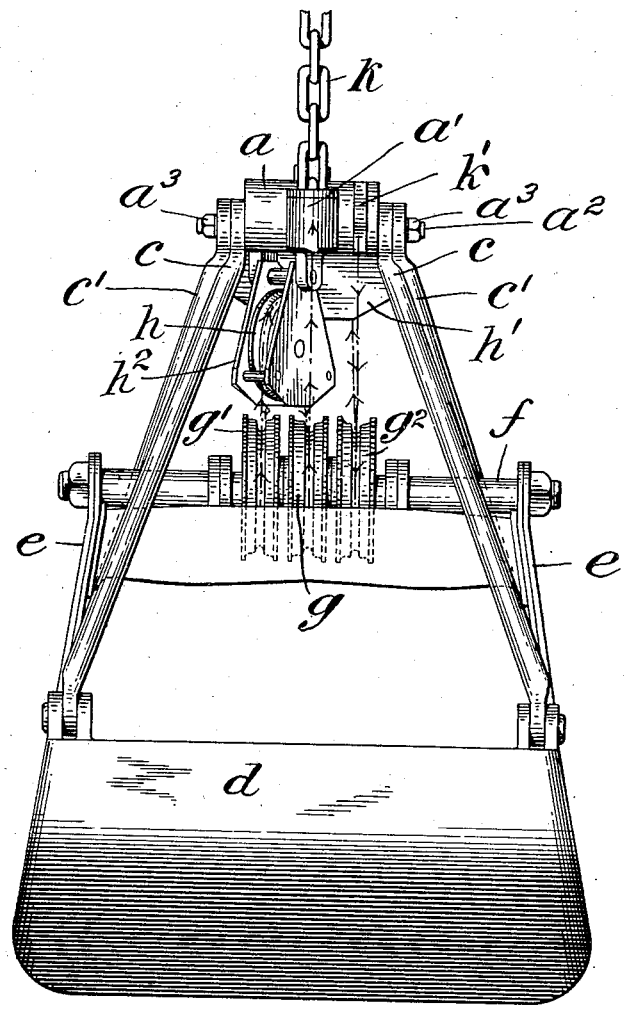

In the drawings—Figure 1 is an end view of a bucket or shovel to which the invention is applied. Fig. 2 is a side view thereof, and Fig. 3 is a detail view of the head-piece, on a larger scale, partly in plan and partly in horizontal section.

The bucket or shovel to which the invention is applied may be of any desirable or ordinary form, as represented in the drawings, except with respect to the connection of the links or arms to the head-piece and to the arrangement of the sheaves for the closing rope, the invention being particularly concerned with these two features of construction and not otherwise with the construction of the bucket. Provision is made whereby the head-piece is restrained from tilting materially with respect to the arms or links which connect it to one side or member of the bucket, whereby the head-piece is held substantially upright when the ropes are slack, while the arms or links which connect it to the other member of the bucket are free to swing with respect to the head-piece.

In the construction shown in the drawings, the head-piece $a$, to which the holding or dumping rope $b$ is connected, receives a bar $a^2$ which is so formed or fitted, as by being squared or of other polygonal shape in cross section, as to be held in the head-piece without turning. This bar provides the means of connection between the head-piece and the arms or links $c$, to the lower ends of which the scoops or shovel members $d$ are pivotally connected. The arms or links $c$ for one of the scoops are so connected to the bar $a^2$ as to be prevented from swinging materially with respect thereto and therefore, as the bar $a^2$ cannot turn with respect to the head-piece, such arms and the head-piece are held from relative movement and the head-piece cannot overturn or twist with respect to such arms but is held always in a practically upright position. As a convenient means for maintaining the relative position of such arms $c$ and the head-piece, the bar $a^2$ may be so fitted, as by being squared or given other polygonal shape in cross section, as to prevent turning movement. The arms or links $c$ for the other scoop or shovel-member are free to swing upon the bar $a^2$, which may be round in cross section, as usual, to furnish a proper bearing for such arms, so that, although the head-piece $a$ is held from turning with respect to one set of arms $c$, the two sets of arms $c$ are relatively free to swing, as is necessary in the operation of shovels or buckets of this character. Nuts $a^3$ may be applied to the ends of the bar $a^2$ for the purpose of retaining the arms or links upon the bar.

In the construction shown in the drawings, the scoops or shovel-members $d$ are provided with upwardly extending arms $e$ and the latter are pivotally connected near their upper ends by a shaft or bar $f$ which receives the lower sheaves $g$, $g'$ and $g^2$ arranged side by side. The upper sheaves, however, are not thus arranged, but are so arranged as to permit the closing rope $k$ to lead always from the central plane of the shovel as through a guide $a'$. For this purpose the head piece is provided with an obliquely disposed sheave $h$, preferably mounted in a frame $h^2$ which depends from the head-piece $a$, and a sheave $h'$ mounted on the head-piece with its axis at right angles to the axis of the sheaves $g$, $g'$ and $g^2$. The end of the closing chain or rope $k$ is fastened to the head-piece, as at $k'$, and the chain or rope passes thence around the lower sheave $g^2$ at one end of the set of lower sheaves, thence upward over the sheave $h'$, thence down around the lower sheave $g'$ at the other end of the set of lower sheaves, thence upward over the obliquely disposed sheave $h$, thence downward around the middle sheave $g$ of the lower set of sheaves, and thence upward through the centrally disposed guide $a'$. The draft of the closing chain or rope $k$ is therefore always through the centrally disposed guide $a'$ and in the same central plane as the draft of the holding rope $b$, so that whether the weight of the bucket be carried by one chain or rope or by the other, there is no tendency of the bucket to tilt to one side or to the other, as would be the case if the draft of the closing rope were directly from one of the end sheaves of the set of lower sheaves. The obliquely disposed sheave $h$ may be hung lower than the sheave $h'$ so that there is no interference between the two sheaves or between the parts of the closing rope or chain leading from either of them to the corresponding lower sheaves. It will be observed also that each part of the chain, as it passes from one sheave to another, runs in a vertical line, and directly from one sheave to the other, so that there is no side pull or chafing on the sheaves.

It will be understood, of course, that with a greater number of lower sheaves, the number and arrangement of the upper sheaves would be increased and extended so as to properly guide the closing chain or rope from one sheave to the other and permit the draft to be always in the central plane. Various modifications in arrangement will readily suggest themselves as desirable to suit different conditions of use.

I claim as my invention:

1. A clam-shell or grab bucket or shovel comprising a head-piece, links, scoops pivotally connected to the links, and connections between the scoops, and means to restrain the head-piece from swinging with respect to the links for one of the scoops, the links for the other of the scoops being free to swing with respect to the head-piece and the first named links.

2. A clam-shell or grab bucket or shovel comprising a head-piece, a bar non-rotatably fixed in the head-piece, supporting links, scoops pivotally supported by said links, and connections between the scoops, the supporting links for one of the scoops being non-rotatably secured to said bar and the links for the other of the scoops being pivotally mounted on said bar.

3. A clam-shell or grab bucket or shovel comprising a head-piece, supporting links, scoops, a plurality of lower sheaves carried by the scoops, and a plurality of sheaves carried by the head-piece, the last named sheaves being disposed in different positions whereby the closing chain or rope after passing about all of the sheaves is led from the central sheave of the lower set through a centrally disposed guide in the head-piece.

4. A clam-shell or grab bucket or shovel comprising a head-piece having a centrally disposed guide for the closing chain or rope, links, scoops supported by the links, a plurality of lower sheaves carried by the scoops and mounted upon a common axis, a sheave mounted on the head-piece and arranged to guide the closing chain or rope from one end sheave of the lower set to the other end sheave of the lower set, and a second sheave mounted on the head piece and arranged to guide said chain or rope from the last named end sheave of the lower set to the central sheave of the lower set, whereby said chain or rope may be led from said central sheave to the centrally disposed guide on the head piece.

5. A clam-shell or grab bucket or shovel comprising a head piece having a centrally disposed guide for the closing chain or rope, links, scoops supported by said links, a set of lower sheaves carried by the scoops and mounted on a common axis, a sheave carried by the head piece with its axis at right angles to the axis of the lower sheaves, whereby said chain or rope may be led from one end sheave of the lower set to the other end sheave of the lower set, and a sheave carried by the head piece with its axis oblique to the axis of the lower sheave whereby the said chain or rope may be led from the last named end sheave to the central sheave of the lower set and thence through the centrally disposed guide on the head piece.

This specification signed and witnessed this second day of April, A. D., 1908.

CHARLES C. KING.

Signed in the presence of—
R. B. KELLY,
CHAS. W. BARNABY.